(12) United States Patent
Hu et al.

(10) Patent No.: US 11,616,547 B2
(45) Date of Patent: Mar. 28, 2023

(54) SPATIAL CONFIGURATION SUBFIELD DESIGNS OF USER FIELD FOR MU-MIMO ALLOCATION IN EXTREME-HIGH-THROUGHPUT SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

(21) Appl. No.: 17/325,805

(22) Filed: May 20, 2021

(65) Prior Publication Data
US 2021/0376893 A1    Dec. 2, 2021

Related U.S. Application Data

(60) Provisional application No. 63/029,743, filed on May 26, 2020.

(51) Int. Cl.
*H04L 27/28*    (2006.01)
*H04B 7/06*    (2006.01)
*H04B 7/0408*    (2017.01)
*H04B 7/0452*    (2017.01)

(52) U.S. Cl.
CPC ......... *H04B 7/0617* (2013.01); *H04B 7/0408* (2013.01); *H04B 7/0452* (2013.01)

(58) Field of Classification Search
CPC ... H04B 7/0408; H04B 7/0617; H04L 5/0053; H04L 1/0009; H04L 1/0023; H04L 27/2602; H04L 5/0044; H04L 5/0091; H04L 5/0048; H04W 72/0453; H04W 84/12; H04W 72/042; H04W 72/0413; H04W 72/0446; H04W 74/002
USPC ......................... 375/260, 262, 267; 370/329
See application file for complete search history.

(56) References Cited

U.S. PATENT DOCUMENTS

| | | | |
|---|---|---|---|
| 2019/0373586 A1 | 12/2019 | Verma et al. | |
| 2021/0135779 A1* | 5/2021 | Gan | H04L 5/0053 |
| 2021/0235383 A1* | 7/2021 | Yukawa | H04W 52/02 |
| 2021/0385110 A1* | 12/2021 | Yukawa | H04L 25/03006 |
| 2021/0392644 A1* | 12/2021 | Liu | H04L 5/0094 |

OTHER PUBLICATIONS

European Patent Office, Extended European Search Report for European Patent Application No. 21175252.2, dated Nov. 26, 2021.

(Continued)

*Primary Examiner* — Khai Tran
(74) *Attorney, Agent, or Firm* — Han IP PLLC; Andy M. Han

(57) ABSTRACT

A method pertaining to spatial configuration subfield designs of user field for multi-user multiple-input-multiple-output (MU-MIMO) allocation in extreme-high-throughput (EHT) systems involves determining a spatial stream configuration according to a 6-bit spatial configuration subfield in a lookup table (LUT). The method also involves performing a transmission using one or more spatial streams assigned based on the spatial stream configuration.

19 Claims, 10 Drawing Sheets

300

| Nuser | B5..B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 2 | 000000-000011 | 1-4 | 1 | | | | | | | 2-5 | 10 |
| | 000100-000110 | 2-4 | 2 | | | | | | | 4-6 | |
| | 000111-001000 | 3-4 | 3 | | | | | | | 6-7 | |
| | 001001 | 4 | 4 | | | | | | | 8 | |
| 3 | 000000-000011 | 1-4 | 1 | 1 | | | | | | 3-6 | 20 |
| | 000100-000110 | 2-4 | 2 | 1 | | | | | | 5-7 | |
| | 000111-001000 | 3-4 | 3 | 1 | | | | | | 7-8 | |
| | 001001 | 4 | 4 | 1 | | | | | | 9 | |
| | 001010-001100 | 2-4 | 2 | 2 | | | | | | 6-8 | |
| | 001101-001110 | 3-4 | 3 | 2 | | | | | | 8-9 | |
| | 001111 | 4 | 4 | 2 | | | | | | 10 | |
| | 010000-010001 | 3-4 | 3 | 3 | | | | | | 9-10 | |
| | 010010 | 4 | 4 | 3 | | | | | | 11 | |
| | 010011 | 4 | 4 | 4 | | | | | | 12 | |

(56) References Cited

OTHER PUBLICATIONS

LAN/MAN Standards Committee of the IEEE Computer Society: "Draft Standard for Information technology—Telecommunications and information exchange between system Local and metropolitan area networks—Specific requirements Part 11: Wireless LAN Medium Access Control (MAC) and Physical Layer (PHY) Specifications Amendment 1: Enhancements for High Efficiency", IEEE Draft; Draft P802.11AX_D6.1, IEEE-SA, Piscataway, NJ, USA, vol. 802.11ax drafts, No. D6.1, May 11, 2020, pp. 1-784, XP068168293.

\* cited by examiner

| Nuser | B5..B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 2 | 000000-000011 | 1-4 | 1 | | | | | | | 2-5 | 10 |
| | 000100-000110 | 2-4 | 2 | | | | | | | 4-6 | |
| | 000111-001000 | 3-4 | 3 | | | | | | | 6-7 | |
| | 001001 | 4 | 4 | | | | | | | 8 | |
| 3 | 000000-000011 | 1-4 | 1 | 1 | | | | | | 3-6 | 20 |
| | 000100-000110 | 2-4 | 2 | 1 | | | | | | 5-7 | |
| | 000111-001000 | 3-4 | 3 | 1 | | | | | | 7-8 | |
| | 001001 | 4 | 4 | 1 | | | | | | 9 | |
| | 001010-001100 | 2-4 | 2 | 2 | | | | | | 6-8 | |
| | 001101-001110 | 3-4 | 3 | 2 | | | | | | 8-9 | |
| | 001111 | 4 | 4 | 2 | | | | | | 10 | |
| | 010000-010001 | 3-4 | 3 | 3 | | | | | | 9-10 | |
| | 010010 | 4 | 4 | 3 | | | | | | 11 | |
| | 010011 | 4 | 4 | 4 | | | | | | 12 | |

FIG. 3

| Nuser | B5..B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 4 | 000000-000011 | 1-4 | 1 | 1 | 1 | | | | | 4-7 | 35 |
| | 000100-000110 | 2-4 | 2 | 1 | 1 | | | | | 6-8 | |
| | 000111-001000 | 3-4 | 3 | 1 | 1 | | | | | 8-9 | |
| | 001001 | 4 | 4 | 1 | 1 | | | | | 10 | |
| | 001010-001100 | 2-4 | 2 | 2 | 1 | | | | | 7-9 | |
| | 001101-001110 | 3-4 | 3 | 2 | 1 | | | | | 9-10 | |
| | 001111 | 4 | 4 | 2 | 1 | | | | | 11 | |
| | 010000-010001 | 3-4 | 3 | 3 | 1 | | | | | 10-11 | |
| | 010010 | 4 | 4 | 3 | 1 | | | | | 12 | |
| | 010011 | 4 | 4 | 4 | 1 | | | | | 13 | |
| | 010100-010110 | 2-4 | 2 | 2 | 2 | | | | | 8-10 | |
| | 010111-011000 | 3-4 | 3 | 2 | 2 | | | | | 10-11 | |
| | 011001 | 4 | 4 | 2 | 2 | | | | | 12 | |
| | 011010-011011 | 3-4 | 3 | 3 | 2 | | | | | 11-12 | |
| | 011100 | 4 | 4 | 3 | 2 | | | | | 13 | |
| | 011101 | 4 | 4 | 4 | 2 | | | | | 14 | |
| | 011110-011111 | 3-4 | 3 | 3 | 3 | | | | | 12-13 | |
| | 100000 | 4 | 4 | 3 | 3 | | | | | 14 | |
| | 100001 | 4 | 4 | 4 | 3 | | | | | 15 | |
| | 100010 | 4 | 4 | 4 | 4 | | | | | 16 | |

FIG. 4

| Nuser | B5..B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 5 | 000000-000011 | 1-4 | 1 | 1 | 1 | 1 | | | | 5-8 | |
| | 000100-000110 | 2-4 | 2 | 1 | 1 | 1 | | | | 7-9 | |
| | 000111-001000 | 3-4 | 3 | 1 | 1 | 1 | | | | 9-10 | |
| | 001001 | 4 | 4 | 1 | 1 | 1 | | | | 11 | |
| | 001010-001100 | 2-4 | 2 | 2 | 1 | 1 | | | | 8-10 | |
| | 001101-001110 | 3-4 | 3 | 2 | 1 | 1 | | | | 10-11 | |
| | 001111 | 4 | 4 | 2 | 1 | 1 | | | | 12 | |
| | 010000-010001 | 3-4 | 3 | 3 | 1 | 1 | | | | 11-12 | |
| | 010010 | 4 | 4 | 3 | 1 | 1 | | | | 13 | |
| | 010011 | 4 | 4 | 4 | 1 | 1 | | | | 14 | |
| | 010100-010110 | 2-4 | 2 | 2 | 2 | 1 | | | | 9-11 | |
| | 010111-011000 | 3-4 | 3 | 2 | 2 | 1 | | | | 11-12 | |
| | 011001 | 4 | 4 | 2 | 2 | 1 | | | | 13 | |
| | 011010-011011 | 3-4 | 3 | 3 | 2 | 1 | | | | 12-13 | |
| | 011100 | 4 | 4 | 3 | 2 | 1 | | | | 14 | |
| | 011101 | 4 | 4 | 4 | 2 | 1 | | | | 15 | |
| | 011110-011111 | 3-4 | 3 | 3 | 3 | 1 | | | | 13-14 | |
| | 100000 | 4 | 4 | 3 | 3 | 1 | | | | 15 | |
| | 100001 | 4 | 4 | 4 | 3 | 1 | | | | 16 | |
| | 100010-100100 | 2-4 | 2 | 2 | 2 | 2 | | | | 10-14 | |
| | 100101-100110 | 3-4 | 3 | 2 | 2 | 2 | | | | 12-13 | |
| | 100111 | 4 | 4 | 2 | 2 | 2 | | | | 14 | |
| | 101000-101001 | 3-4 | 3 | 3 | 2 | 2 | | | | 13~14 | |
| | 101010 | 4 | 4 | 3 | 2 | 2 | | | | 15 | |
| | 101011 | 4 | 4 | 4 | 2 | 2 | | | | 16 | |
| | 101100-101101 | 3-4 | 3 | 3 | 3 | 2 | | | | 14~15 | |
| | 101110 | 4 | 4 | 3 | 3 | 2 | | | | 16 | |
| | 101111-110000 | 3-4 | 3 | 3 | 3 | 3 | | | | 15~16 | 49 |

FIG. 5

| Nuser | B5..B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 6 | 000000-000011 | 1-4 | 1 | 1 | 1 | 1 | 1 | | | 6-9 | 54 |
| | 000100-000110 | 2-4 | 2 | 1 | 1 | 1 | 1 | | | 8-10 | |
| | 000111-001000 | 3-4 | 3 | 1 | 1 | 1 | 1 | | | 10-11 | |
| | 001001 | 4 | 4 | 1 | 1 | 1 | 1 | | | 12 | |
| | 001010-001100 | 2-4 | 2 | 2 | 1 | 1 | 1 | | | 7-9 | |
| | 001101-001110 | 3-4 | 3 | 2 | 1 | 1 | 1 | | | 11-12 | |
| | 001111 | 4 | 4 | 2 | 1 | 1 | 1 | | | 13 | |
| | 010000-010001 | 3-4 | 3 | 3 | 1 | 1 | 1 | | | 12-13 | |
| | 010010 | 4 | 4 | 3 | 1 | 1 | 1 | | | 14 | |
| | 010011 | 4 | 4 | 4 | 1 | 1 | 1 | | | 15 | |
| | 010100-010110 | 2-4 | 2 | 2 | 2 | 1 | 1 | | | 10-12 | |
| | 010111-011000 | 3-4 | 3 | 2 | 2 | 1 | 1 | | | 12-13 | |
| | 011001 | 4 | 4 | 2 | 2 | 1 | 1 | | | 14 | |
| | 011010-011011 | 3-4 | 3 | 3 | 2 | 1 | 1 | | | 13-14 | |
| | 011100 | 4 | 4 | 3 | 2 | 1 | 1 | | | 15 | |
| | 011101 | 4 | 4 | 3 | 3 | 1 | 1 | | | 16 | |
| | 011110-011111 | 3-4 | 3 | 3 | 3 | 2 | 1 | | | 14-15 | |
| | 100000 | 4 | 4 | 3 | 3 | 1 | 1 | | | 14 | |
| | 100001-100011 | 2-4 | 2 | 2 | 2 | 2 | 1 | | | 11-13 | |
| | 100100-100101 | 3-4 | 3 | 2 | 2 | 2 | 1 | | | 13-14 | |
| | 100110-100111 | 3-4 | 3 | 3 | 2 | 2 | 1 | | | 14-15 | |
| | 101000-101001 | 3-4 | 3 | 3 | 3 | 2 | 1 | | | 15-16 | |
| | 101010 | 4 | 4 | 3 | 2 | 2 | 1 | | | 16 | |
| | 101011 | 4 | 4 | 2 | 2 | 2 | 1 | | | 15 | |
| | 101100 | 4 | 4 | 2 | 3 | 2 | 2 | | | 16 | |
| | 101101 | 3 | 3 | 3 | 3 | 2 | 2 | | | 16 | |
| | 101110 | 3 | 3 | 3 | 3 | 2 | 2 | | | 16 | |
| | 101111-110001 | 2-4 | 2 | 2 | 2 | 2 | 2 | | | 12-14 | |
| | 110010-110011 | 3-4 | 3 | 2 | 2 | 2 | 2 | | | 14-15 | |
| | 110100-110101 | 3-4 | 3 | 3 | 2 | 2 | 2 | | | 15-16 | |

| Nuser | B5...B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 7 | 000000-000011 | 1-4 | 1 | 1 | 1 | 1 | 1 | 1 | | 7-10 | 50 |
| | 000100-000110 | 2-4 | 2 | 1 | 1 | 1 | 1 | 1 | | 9-11 | |
| | 000111-001000 | 3-4 | 3 | 1 | 1 | 1 | 1 | 1 | | 11-12 | |
| | 001001 | 4 | 4 | 1 | 1 | 1 | 1 | 1 | | 13 | |
| | 001010-001100 | 2-4 | 2 | 2 | 1 | 1 | 1 | 1 | | 10-14 | |
| | 001101-001110 | 3-4 | 3 | 2 | 1 | 1 | 1 | 1 | | 12-13 | |
| | 001111 | 4 | 4 | 2 | 1 | 1 | 1 | 1 | | 14 | |
| | 010000-010001 | 3-4 | 3 | 3 | 1 | 1 | 1 | 1 | | 13-14 | |
| | 010010 | 4 | 4 | 3 | 1 | 1 | 1 | 1 | | 15 | |
| | 010011 | 4 | 4 | 4 | 1 | 1 | 1 | 1 | | 16 | |
| | 010100-010110 | 2-4 | 2 | 2 | 2 | 1 | 1 | 1 | | 11-13 | |
| | 010111-011000 | 3-4 | 3 | 2 | 2 | 1 | 1 | 1 | | 13-14 | |
| | 011001 | 4 | 4 | 2 | 2 | 1 | 1 | 1 | | 15 | |
| | 011010-011011 | 3-4 | 3 | 3 | 2 | 1 | 1 | 1 | | 14-15 | |
| | 011100 | 4 | 4 | 3 | 2 | 1 | 1 | 1 | | 16 | |
| | 011101-011110 | 3-4 | 3 | 3 | 3 | 2 | 1 | 1 | | 15-16 | |
| | 011111-100001 | 2-4 | 2 | 2 | 2 | 2 | 1 | 1 | | 12-14 | |
| | 100010-100011 | 3-4 | 3 | 3 | 2 | 2 | 1 | 1 | | 14-15 | |
| | 100100 | 4 | 4 | 3 | 3 | 2 | 1 | 1 | | 16 | |
| | 100101 | 3 | 3 | 2 | 2 | 2 | 2 | 1 | | 16 | |
| | 100110-101000 | 2-4 | 2 | 2 | 2 | 2 | 2 | 1 | | 13-15 | |
| | 101001-101010 | 3-4 | 3 | 3 | 2 | 2 | 2 | 1 | | 15-16 | |
| | 101011-101100 | 3-4 | 3 | 3 | 2 | 2 | 1 | 1 | | 15-16 | |
| | 101101 | 3 | 3 | 2 | 2 | 2 | 2 | 1 | | 16 | |
| | 101110 | 3 | 3 | 2 | 2 | 2 | 2 | 2 | | 16 | |
| | 101111-110001 | 2-4 | 2 | 2 | 2 | 2 | 2 | 2 | | 14-16 | |

FIG. 7

| Nuser | B5..B0 | Nsts(1) | Nsts(2) | Nsts(3) | Nsts(4) | Nsts(5) | Nsts(6) | Nsts(7) | Nsts(8) | Nsts_tot | Total Entries |
|---|---|---|---|---|---|---|---|---|---|---|---|
| 8 | 000000-000011 | 1-4 | 1 | 1 | 1 | 1 | 1 | 1 | 1 | 8~11 | 41 |
|   | 000100-000110 | 2-4 | 2 | 1 | 1 | 1 | 1 | 1 | 1 | 10~12 |   |
|   | 000111-001000 | 3-4 | 3 | 1 | 1 | 1 | 1 | 1 | 1 | 12~13 |   |
|   | 001001 | 4 | 4 | 1 | 1 | 1 | 1 | 1 | 1 | 14 |   |
|   | 001010-001100 | 2-4 | 2 | 2 | 1 | 1 | 1 | 1 | 1 | 11~13 |   |
|   | 001101-001110 | 3-4 | 3 | 2 | 1 | 1 | 1 | 1 | 1 | 13~14 |   |
|   | 001111 | 4 | 4 | 2 | 1 | 1 | 1 | 1 | 1 | 15 |   |
|   | 010000-010001 | 3-4 | 3 | 3 | 1 | 1 | 1 | 1 | 1 | 14~15 |   |
|   | 010010 | 4 | 4 | 3 | 1 | 1 | 1 | 1 | 1 | 16 |   |
|   | 010011-010101 | 2-4 | 2 | 2 | 2 | 1 | 1 | 1 | 1 | 12~14 |   |
|   | 010110-010111 | 3-4 | 3 | 2 | 2 | 1 | 1 | 1 | 1 | 12~13 |   |
|   | 011000 | 4 | 4 | 2 | 2 | 1 | 1 | 1 | 1 | 16 |   |
|   | 011001-011010 | 3-4 | 3 | 3 | 2 | 1 | 1 | 1 | 1 | 15~16 |   |
|   | 011011 | 3 | 3 | 3 | 3 | 1 | 1 | 1 | 1 | 16 |   |
|   | 011100-011110 | 2-4 | 2 | 2 | 2 | 2 | 1 | 1 | 1 | 13~15 |   |
|   | 011111-100000 | 3-4 | 3 | 2 | 2 | 2 | 1 | 1 | 1 | 15~16 |   |
|   | 100001 | 3 | 3 | 3 | 2 | 2 | 1 | 1 | 1 | 16 |   |
|   | 100010-100100 | 2-4 | 2 | 2 | 2 | 2 | 2 | 1 | 1 | 14~16 |   |
|   | 100101 | 3 | 3 | 2 | 2 | 2 | 2 | 1 | 1 | 16 |   |
|   | 100110-100111 | 2-3 | 2 | 2 | 2 | 2 | 2 | 2 | 1 | 15~16 |   |
|   | 101000 | 2 | 2 | 2 | 2 | 2 | 2 | 2 | 2 | 16 |   |

FIG. 8 a# SPATIAL CONFIGURATION SUBFIELD DESIGNS OF USER FIELD FOR MU-MIMO ALLOCATION IN EXTREME-HIGH-THROUGHPUT SYSTEMS

CROSS REFERENCE TO RELATED PATENT APPLICATION

The present disclosure is part of a non-provisional patent application claiming the priority benefit of U.S. Provisional Patent Application No. 63/029,743, filed 26 May 2020, the content of which being incorporated by reference in its entirety.

TECHNICAL FIELD

The present disclosure is generally related to wireless communications and, more particularly, to spatial configuration subfield designs of user field for multi-user multiple-input-multiple-output (MU-MIMO) allocation in extreme-high-throughput (EHT) systems.

BACKGROUND

Unless otherwise indicated herein, approaches described in this section are not prior art to the claims listed below and are not admitted as prior art by inclusion in this section.

In wireless communications, such as Wi-Fi in accordance with the Institute of Electrical and Electronics Engineers (IEEE) 802.11ax standard, spatial configuration of a user field for a MU-MIMO allocation is signaled with 4 bits and is lookup table (LUT) based. In next-generation EHT systems such as wireless local area network (WLAN) systems in accordance with the upcoming IEEE 802.11be standard, the total number of spatial streams is increased up to 16 while the total number of MU-MIMO users is up to 8 users which is the same as with IEEE 802.11ax. Moreover, the total number of spatial streams per user is up to 4 streams which is also the same as with IEEE 802.11ax. There is, therefore, a need for a solution for spatial configuration of user field format for MU-MIMO allocation in wireless communications based on IEEE 802.11bx and future technologies.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to spatial configuration subfield designs of user field for MU-MIMO allocation in EHT systems. Under various proposed schemes in accordance with the present disclosure, either of two proposed design options for spatial configuration of user field for a MU-MIMO allocation may be utilized. Under a first option, self-contained Spatial Stream (SS) allocation subfield style may be utilized as in trigger frames specified in IEEE 802.11ax for uplink (UL) Trigger-Based (TB) PPDU. Under a second option, a Look-Up-Table (LUT) style may be utilized for downlink (DL) MU-MIMO allocation signaling, with a new design of spatial configuration subfield encoding table. Moreover, under the various proposed schemes, 6 bits may be utilized for spatial configuration signaling.

In one aspect, a method may involve determining a spatial stream configuration according to a 6-bit spatial configuration subfield in an LUT. The method may also involve performing a transmission using one or more spatial streams assigned based on the spatial stream configuration.

In another aspect, an apparatus may include a transceiver and a processor coupled to the transceiver. The processor may determine a spatial stream configuration according to a 6-bit spatial configuration subfield in an LUT. The processor may also perform, via the transceiver, a transmission using one or more spatial streams assigned based on the spatial stream configuration.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example design under a second proposed scheme in accordance with the present disclosure.

FIG. 4 is a diagram of an example design under the second proposed scheme in accordance with the present disclosure.

FIG. 5 is a diagram of an example design under the second proposed scheme in accordance with the present disclosure.

FIG. 6 is a diagram of an example design under the second proposed scheme in accordance with the present disclosure.

FIG. 7 is a diagram of an example design under the second proposed scheme in accordance with the present disclosure.

FIG. 8 is a diagram of an example design under the second proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to spatial configuration subfield designs of user field for MU-MIMO allocation in EHT systems. According to the present disclosure, a number of possible solutions may be implemented separately or jointly. That is, although these possible solutions may be described below separately, two or more of these possible solutions may be implemented in one combination or another.

Figure 1:
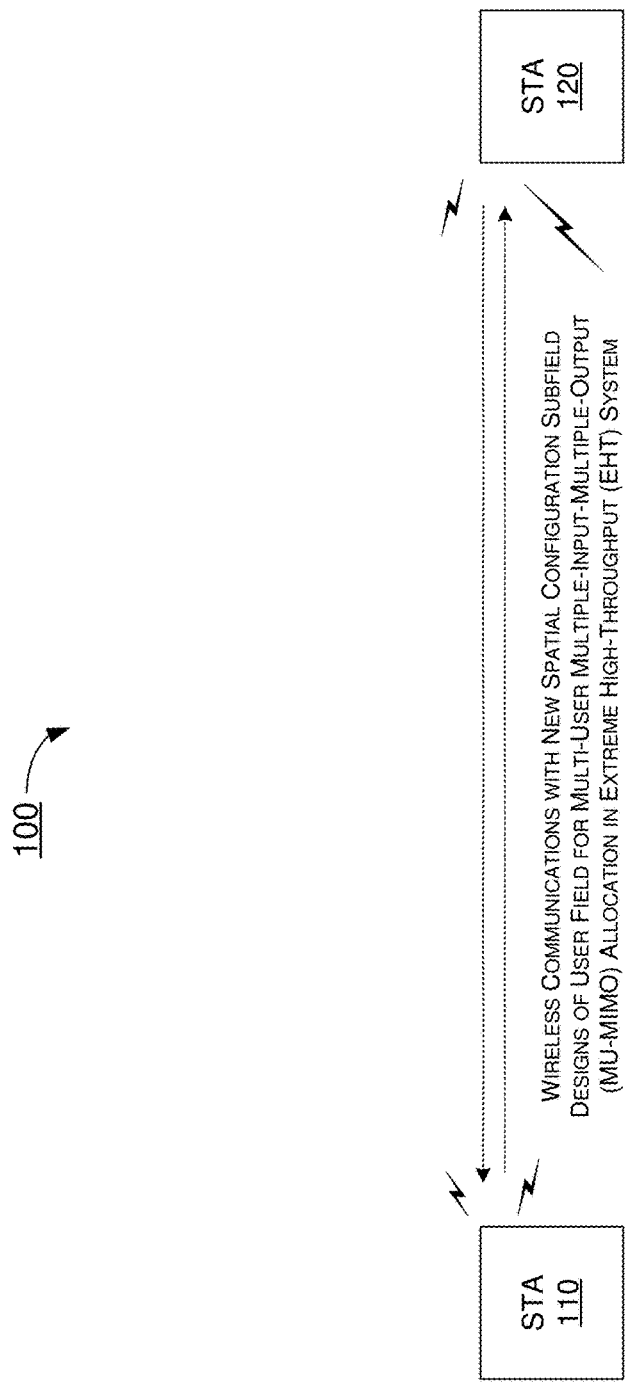
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an AP. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the new spatial configuration subfield designs of user field for MU-MIMO allocation in EHT systems in accordance with various proposed schemes described below. That is, either or both of STA 110 and STA 120 may function as a "user" in the proposed schemes and examples described below.

Figure 2:
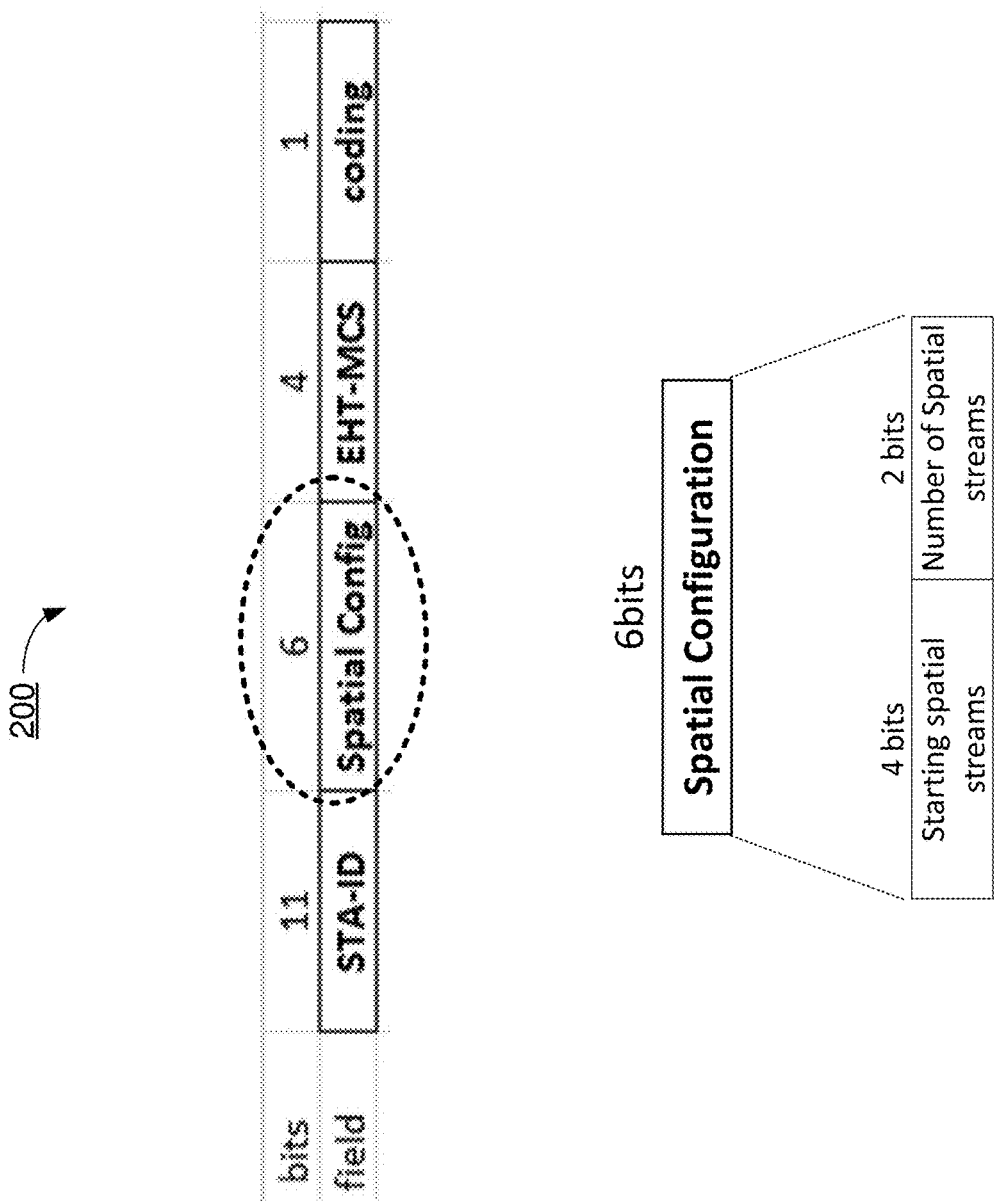
FIG. 2 is a diagram of an example design under a first proposed scheme in accordance with the present disclosure.

FIG. 2 illustrates an example design 200 under a first proposed scheme in accordance with the present disclosure. Under the first proposed scheme, spatial configuration subfield design may be similar to the "Spatial Stream (SS) Allocation subfield style" in trigger frames as defined in IEEE 802.11ax and 6 bits may be utilized in a spatial configuration subfield for spatial configuration signaling (e.g., to indicate the starting stream and the number of spatial streams for a user or STA in an MU-MIMO allocation). Referring to FIG. 2, among the 6 bits used for spatial configuration signaling, 4 bits may be utilized to indicate the spatial starting index for each user and 2 bits may be utilized to indicate the number of streams assigned to each user. Under the proposed scheme, up to 8 users may be supported for up to total 16 spatial streams and up to 4 streams per user.

FIG. 3~FIG. 8 illustrate example designs 300, 400, 500, 600, 700 and 800 under a second proposed scheme in accordance with the present disclosure. Under the second proposed scheme, a lookup table (LUT) may be utilized to indicate the spatial configuration for each user or STA in the MU-MIMO allocation signaling. Referring to each of FIG. 3~FIG. 8, 6 bits or B5B4B3B2B1 B0 (shown as "B5 . . . B0" in FIG. 3~FIG. 8) may be utilized in a spatial configuration subfield for spatial configuration signaling for all entries (e.g., to indicate the number of spatial streams for a user in an MU-MIMO allocation). In example 300, the number of MU-MIMO users ($N_{user}$) may be 2 or 3 with total 10 entries or 20 entries, respectively. In example 400, $N_{user}$ may be 4 with total 35 entries. In example 500, $N_{user}$ may be 5 with total 49 entries. In example 600, $N_{user}$ may be 6 with total 54 entries. In example 700, $N_{user}$ may be 7 with total 50 entries. In example 800, $N_{user}$ may be 8 with total 41 entries. In each of examples 300~800, the assignment style specified in IEEE 802.11ax may be utilized to fill up each row for the 6-bit spatial configuration subfield of "B5 . . . B0" for spatial configuration signaling. Furthermore, based on a STA identifier (ID) in signaling received from an AP (e.g., in a DL preamble), each user or STA may determine its position or order (e.g., the STA being the first user or an $N^{th}$ user) in spatial stream assignment/allocation configuration with respect to one or more resource units (RUs).

In each of examples 300~800, for a given number of users, there may be a variety of arrangements in the number of spatial streams ($N_{sts}$) for each of two and up to eight users (indicated under the headings of "Nsts(1)", "Nsts(2)", "Nsts(3)", "Nsts(4)", "Nsts(5)", "Nsts(6)", "Nsts(7)" and "Nsts(8)") with different corresponding total numbers of spatial streams ($N_{sts\_tot}$). For instance, for $N_{user}=2$ in example 300, the 6-bit spatial configuration subfield may be 000000-000011 to indicate a first user being assigned an $N_{sts}$ in a range between 1 and 4 (indicated under the heading of "Nsts(1)") and a second user being assigned an $N_{sts}$ of 1 (indicated under the heading of "Nsts(2)"), for an $N_{sts\_tot}$ in a range between 2 and 5. Here, the number of options=4 (as the first user may have one spatial stream, two spatial streams, three spatial streams, or four spatial streams), corresponding to four entries of the 6-bit spatial configuration subfield as follows: 000000 indicating Nsts(1)=1 and Nsts(2)=1, 000001 indicating Nsts(1)=2 and Nsts(2)=1, indicating Nsts(1)=1 and Nsts(2)=1, 000010 indicating Nsts(1)=3 and Nsts(2)=1, and 000011 indicating Nsts(1)=4 and Nsts(2)=1.

Similarly, for $N_{user}=2$ in example 300, the 6-bit spatial configuration subfield may be 000100-000110 to indicate the first user being assigned an $N_{sts}$ in a range between 2 and 4 and the second user being assigned an $N_{sts}$ of 2, for an $N_{sts\_tot}$ in a range between 4 and 6. Here, the number of options=3 (as the first user may have one spatial stream, two spatial streams, or three spatial streams), corresponding to three entries of the 6-bit spatial configuration subfield as follows: 000100 indicating Nsts(1)=2 and Nsts(2)=2, 000101 indicating Nsts(1)=3 and Nsts(2)=2, and 000110 indicating Nsts(1)=4 and Nsts(2)=2.

Likewise, for $N_{user}=2$ in example 300, the 6-bit spatial configuration subfield may be 000111-001000 to indicate the first user being assigned an $N_{sts}$ in a range between 3 and 4 and the second user being assigned an $N_{sts}$ of 3, for an $N_{sts\_tot}$ in a range between 6 and 7. Here, the number of options=2 (as the first user may have one spatial stream or two spatial streams), corresponding to two entries of the 6-bit spatial configuration subfield as follows: 000111 indicating Nsts(1)=3 and Nsts(2)=3, and 001000 indicating Nsts(1)=4 and Nsts(2)=3.

Moreover, for $N_{user}=2$ in example 300, the 6-bit spatial configuration subfield may be 001001 to indicate the first user being assigned an $N_{sts}$ of 4 and the second user being assigned an $N_{sts}$ of 4, for an $N_{sts\_tot}$ of 8. Here, the number of options=1 (as the first user may have one spatial stream), corresponding to one entry of the 6-bit spatial configuration subfield as follows: 001001 indicating Nsts(1)=4 and Nsts (2)=4.

Thus, for $N_{user}$=2 in example 300, the number of total entries=10, which is the sum of the numbers of options or sum of the numbers of entries of the 6-bit spatial configuration subfield (=4+3+2+1).

It is noteworthy that, under the proposed scheme, the number of spatial streams assigned to the first user is greater than or equal to the number of spatial streams assigned to the second user (and any additional user). For instance, in example 300, the number of spatial streams assigned to the first user is greater than or equal to the number of spatial streams assigned to the second user. Similarly, in each of examples 400–800, the number of spatial streams assigned to the first user is greater than or equal to the number of spatial streams assigned to the second user and each additional user. Moreover, in examples 300–800, the $N_{sts}$ tot may be as low as 2 and may be up to 16 assigned for transmission on a given RU or aggregated multiple-RUs (MRU). It is also noteworthy that the ten entries of the 6-bit spatial configuration subfield used for $N_{user}$=2 may be reused as the first ten entries in respective portions of the LUT for $N_{user}$=3, $N_{user}$=4, $N_{user}$=5, $N_{user}$=6, $N_{user}$=7 and $N_{user}$=8. Similarly, the twenty entries of the 6-bit spatial configuration subfield used for $N_{user}$=3 may be reused as the first twenty entries in respective portions of the LUT for $N_{user}$=4, $N_{user}$=5, $N_{user}$=6, $N_{user}$=7 and $N_{user}$=8.

Illustrative Implementations

Figure 9:
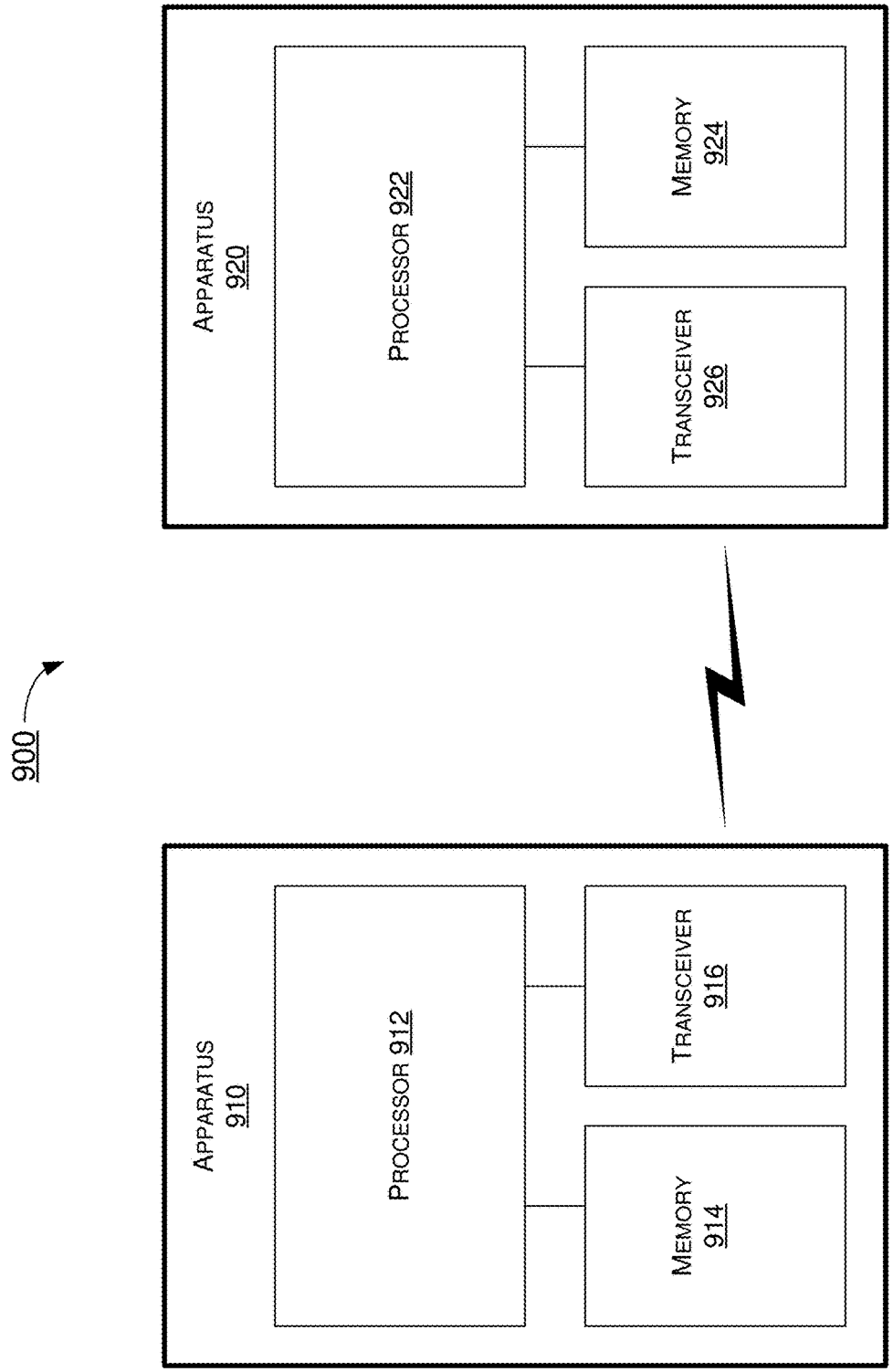
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to spatial configuration subfield designs of user field for MU-MIMO allocation in EHT systems, including the various schemes described above with respect to various proposed designs, concepts, schemes, systems and methods described above as well as processes described below. For instance, apparatus 910 may be implemented in STA 110 and apparatus 920 may be implemented in STA 120, or vice versa.

Each of apparatus 910 and apparatus 920 may be a part of an electronic apparatus, which may be a STA or an AP, such as a portable or mobile apparatus, a wearable apparatus, a wireless communication apparatus or a computing apparatus. When implemented in a STA, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to spatial configuration subfield designs of user field for MU-MIMO allocation in EHT systems in accordance with various implementations of the present disclosure.

In some implementations, apparatus 910 may also include a transceiver 916 coupled to processor 912. Transceiver 916 may include a transmitter capable of wirelessly transmitting and a receiver capable of wirelessly receiving data. In some implementations, apparatus 920 may also include a transceiver 926 coupled to processor 922. Transceiver 926 may include a transmitter capable of wirelessly transmitting and a receiver capable of wirelessly receiving data. It is noteworthy that, although transceiver 916 and transceiver 926 are illustrated as being external to and separate from processor 912 and processor 922, respectively, in some implementations, transceiver 916 may be an integral part of processor 912 as a system on chip (SoC) and/or transceiver 926 may be an integral part of processor 922 as a SoC.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as STA 110, and apparatus 920, as STA 120, is provided below. It is noteworthy that, although a detailed description of capabilities, functionalities and/or technical features of apparatus 910 is provided below, the same may be applied to apparatus 920 although a detailed description thereof is not provided solely in the interest of brevity. It is also noteworthy that, although the example implementations described below are provided in the context of WLAN, the same may be implemented in other types of networks.

Under a proposed scheme pertaining to spatial configuration subfield designs of user field for MU-MIMO allocation in EHT systems in accordance with the present disclosure, with apparatus 910 implemented in or as STA 110 and apparatus 920 implemented in or as STA 120 in network environment 100, processor 912 of apparatus 910 may determine a spatial stream configuration according to a 6-bit spatial configuration subfield in an LUT. Additionally, processor 912 may perform, via transceiver 916, a transmission using one or more spatial streams assigned based on the spatial stream configuration.

In some implementations, the 6-bit spatial configuration subfield may indicate a respective number of spatial streams assigned to each STA of a plurality of STAs in a MU-MIMO allocation.

In some implementations, in an event that a number of STAs configured by the MU-MIMO allocation is two, a respective portion of the LUT may include ten entries of the 6-bit spatial configuration subfield.

In some implementations, values of four of the ten entries of the 6-bit spatial configuration subfield may include: (a) 000000, corresponding to a first STA being assigned one spatial stream and a second STA being assigned one spatial stream for total two spatial streams assigned, (b) 000001, corresponding to the first STA being assigned two spatial streams and the second STA being assigned one spatial stream for total three spatial streams assigned, (c) 000010, corresponding to the first STA being assigned three spatial streams and the second STA being assigned one spatial stream for total four spatial streams assigned, and (d) 000011, corresponding to the first STA being assigned four spatial streams and the second STA being assigned one spatial stream for total five spatial streams assigned.

In some implementations, values of three of the ten entries of the 6-bit spatial configuration subfield may include: (e) 000100, corresponding to a first STA being assigned two spatial streams and a second STA being assigned two spatial streams for total four spatial streams assigned, (f) 000101, corresponding to the first STA being assigned three spatial streams and the second STA being assigned two spatial streams for total five spatial streams assigned, and (g) 000110, corresponding to the first STA being assigned four spatial streams and the second STA being assigned two spatial streams for total six spatial streams assigned.

In some implementations, values of two of the ten entries of the 6-bit spatial configuration subfield may include: (h) 000111, corresponding to a first STA being assigned three spatial streams and a second STA being assigned three spatial streams for total six spatial streams assigned, and (i) 001000, corresponding to the first STA being assigned four spatial streams and the second STA being assigned three spatial streams for total seven spatial streams assigned.

In some implementations, a value of one of the ten entries of the 6-bit spatial configuration subfield may include: (j) 001001, corresponding to a first STA being assigned four spatial streams and a second STA being assigned four spatial streams for total eight spatial streams assigned.

In some implementations, in an event that the number of STAs configured by the MU-MIMO allocation is three or more (and up to eight), first ten entries of the 6-bit spatial configuration subfield in another portion of the LUT may be identical to the ten entries of the 6-bit spatial configuration subfield used for MU-MIMO allocation when the number of STAs configured by the MU-MIMO allocation is two.

In some implementations, in an event that a number of STAs configured by the MU-MIMO allocation is three, a respective portion of the LUT may include twenty entries of the 6-bit spatial configuration subfield.

In some implementations, in an event that a number of STAs configured by the MU-MIMO allocation is four, a respective portion of the LUT may include thirty-five entries of the 6-bit spatial configuration subfield.

In some implementations, in an event that a number of STAs configured by the MU-MIMO allocation is five, a respective portion of the LUT may include forty-nine entries of the 6-bit spatial configuration subfield.

In some implementations, in an event that a number of STAs configured by the MU-MIMO allocation is six, a respective portion of the LUT may include fifty-four entries of the 6-bit spatial configuration subfield.

In some implementations, in an event that a number of STAs configured by the MU-MIMO allocation is seven, a respective portion of the LUT may include fifty entries of the 6-bit spatial configuration subfield.

In some implementations, in an event that a number of STAs configured by the MU-MIMO allocation is eight, a respective portion of the LUT may include forty-one entries of the 6-bit spatial configuration subfield.

In some implementations, the LUT may support up to eight users/STAs for up to sixteen spatial streams total assigned and up to four streams per user/STA.

In some implementations, in determining the spatial stream configuration, processor 912 may perform certain operations. For instance, processor 912 may receive, via transceiver 916, a DL MU-MIMO allocation signaling. Additionally, processor 912 may determine the spatial stream configuration according to a value of the 6-bit spatial configuration subfield indicated in the signaling.

Illustrative Processes

Figure 10:
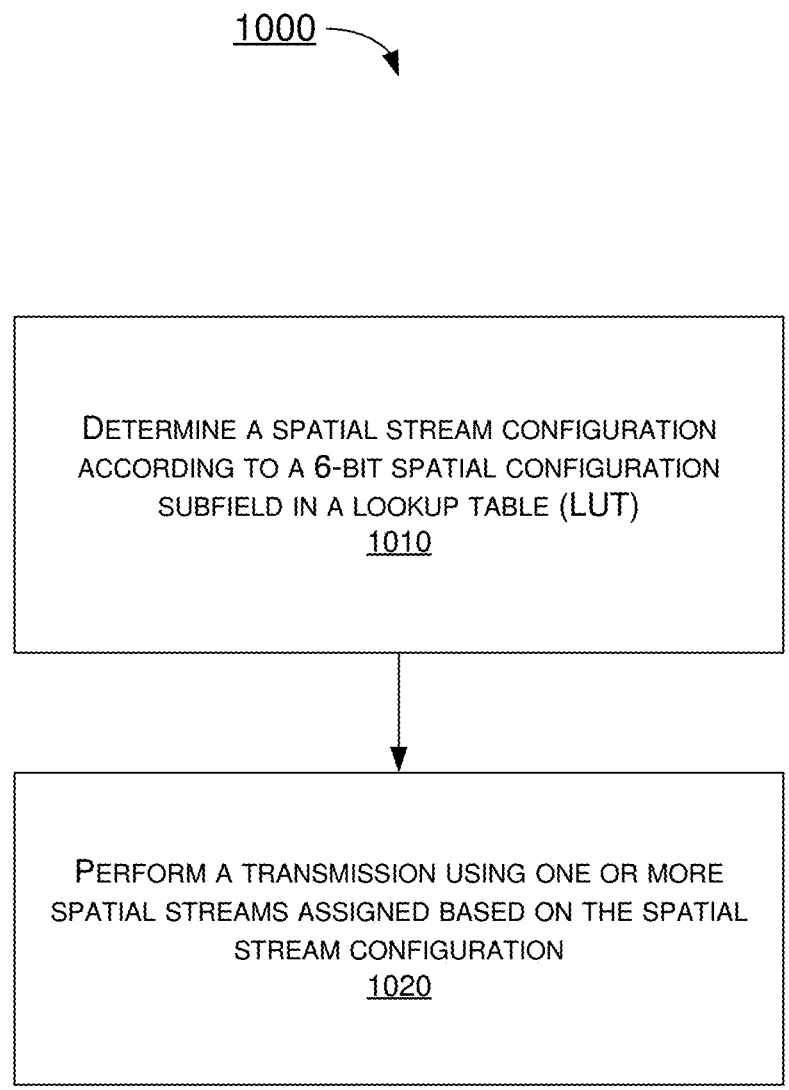
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to spatial configuration subfield designs of user field for MU-MIMO allocation in EHT systems in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 implemented in or as STA 110 and apparatus 920 implemented in or as STA 120 of a wireless network such as a WLAN in network environment 100 in accordance with one or more of IEEE 802.11 standards. Process 1000 may begin at block 1010.

At 1010, process 1000 may involve processor 912 of apparatus 910 (e.g., STA 110) determining a spatial stream configuration according to a 6-bit spatial configuration subfield in an LUT. Process 1000 may proceed from 1010 to 1020.

At 1020, process 1000 may involve processor 912 performing a transmission using one or more spatial streams assigned based on the spatial stream configuration.

In some implementations, the 6-bit spatial configuration subfield may indicate a respective number of spatial streams assigned to each STA of a plurality of STAs in a MU-MIMO allocation.

In some implementations, in an event that a number of STAs configured by the MU-MIMO allocation is two, a respective portion of the LUT may include ten entries of the 6-bit spatial configuration subfield.

In some implementations, values of four of the ten entries of the 6-bit spatial configuration subfield may include: (a) 000000, corresponding to a first STA being assigned one spatial stream and a second STA being assigned one spatial stream for total two spatial streams assigned, (b) 000001, corresponding to the first STA being assigned two spatial streams and the second STA being assigned one spatial stream for total three spatial streams assigned, (c) 000010, corresponding to the first STA being assigned three spatial streams and the second STA being assigned one spatial stream for total four spatial streams assigned, and (d) 000011, corresponding to the first STA being assigned four spatial streams and the second STA being assigned one spatial stream for total five spatial streams assigned.

In some implementations, values of three of the ten entries of the 6-bit spatial configuration subfield may include: (e) 000100, corresponding to a first STA being assigned two spatial streams and a second STA being assigned two spatial streams for total four spatial streams assigned, (f) 000101, corresponding to the first STA being assigned three spatial streams and the second STA being assigned two spatial streams for total five spatial streams assigned, and (g) 000110, corresponding to the first STA being assigned four spatial streams and the second STA being assigned two spatial streams for total six spatial streams assigned.

In some implementations, values of two of the ten entries of the 6-bit spatial configuration subfield may include: (h) 000111, corresponding to a first STA being assigned three spatial streams and a second STA being assigned three spatial streams for total six spatial streams assigned, and (i) 001000, corresponding to the first STA being assigned four spatial streams and the second STA being assigned three spatial streams for total seven spatial streams assigned.

In some implementations, a value of one of the ten entries of the 6-bit spatial configuration subfield may include: (j) 001001, corresponding to a first STA being assigned four spatial streams and a second STA being assigned four spatial streams for total eight spatial streams assigned.

In some implementations, in an event that the number of STAs configured by the MU-MIMO allocation is three or more (and up to eight), first ten entries of the 6-bit spatial configuration subfield in another portion of the LUT may be identical to the ten entries of the 6-bit spatial configuration subfield used for MU-MIMO allocation when the number of STAs configured by the MU-MIMO allocation is two.

In some implementations, in an event that a number of STAs configured by the MU-MIMO allocation is three, a respective portion of the LUT may include twenty entries of the 6-bit spatial configuration subfield.

In some implementations, in an event that a number of STAs configured by the MU-MIMO allocation is four, a respective portion of the LUT may include thirty-five entries of the 6-bit spatial configuration subfield.

In some implementations, in an event that a number of STAs configured by the MU-MIMO allocation is five, a respective portion of the LUT may include forty-nine entries of the 6-bit spatial configuration subfield.

In some implementations, in an event that a number of STAs configured by the MU-MIMO allocation is six, a respective portion of the LUT may include fifty-four entries of the 6-bit spatial configuration subfield.

In some implementations, in an event that a number of STAs configured by the MU-MIMO allocation is seven, a respective portion of the LUT may include fifty entries of the 6-bit spatial configuration subfield.

In some implementations, in an event that a number of STAs configured by the MU-MIMO allocation is eight, a respective portion of the LUT may include forty-one entries of the 6-bit spatial configuration subfield.

In some implementations, the LUT may support up to eight users/STAs for up to sixteen spatial streams total assigned and up to four streams per user/STA.

In some implementations, in determining the spatial stream configuration, process 1000 may involve processor 912 performing certain operations. For instance, process 1000 may involve processor 912 receiving, via transceiver 916, a DL MU-MIMO allocation signaling. Additionally, process 1000 may involve processor 912 determining the spatial stream configuration according to a value of the 6-bit spatial configuration subfield indicated in the signaling.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining a spatial stream configuration according to a 6-bit spatial configuration subfield in a lookup table (LUT); and
   performing a transmission using one or more spatial streams assigned based on the spatial stream configuration,
   wherein the LUT supports up to sixteen spatial streams total for up to eight multi-user multiple-input-multiple-output (MU-MIMO) users.

2. The method of claim 1, wherein the 6-bit spatial configuration subfield indicates a respective number of spatial streams assigned to each station (STA) of a plurality of STAs in a MU-MIMO allocation.

3. The method of claim 2, wherein, in an event that a number of STAs configured by the MU-MIMO allocation is two, a respective portion of the LUT comprises ten entries of the 6-bit spatial configuration subfield.

4. The method of claim 3, wherein values of four of the ten entries of the 6-bit spatial configuration subfield comprise:
   000000, corresponding to a first STA being assigned one spatial stream and a second STA being assigned one spatial stream for total two spatial streams assigned,
   000001, corresponding to the first STA being assigned two spatial streams and the second STA being assigned one spatial stream for total three spatial streams assigned,
   000010, corresponding to the first STA being assigned three spatial streams and the second STA being assigned one spatial stream for total four spatial streams assigned, and
   000011, corresponding to the first STA being assigned four spatial streams and the second STA being assigned one spatial stream for total five spatial streams assigned.

5. The method of claim 3, wherein values of three of the ten entries of the 6-bit spatial configuration subfield comprise:
   000100, corresponding to a first STA being assigned two spatial streams and a second STA being assigned two spatial streams for total four spatial streams assigned,
   000101, corresponding to the first STA being assigned three spatial streams and the second STA being assigned two spatial streams for total five spatial streams assigned, and
   000110, corresponding to the first STA being assigned four spatial streams and the second STA being assigned two spatial streams for total six spatial streams assigned.

6. The method of claim 3, wherein values of two of the ten entries of the 6-bit spatial configuration subfield comprise:
   000111, corresponding to a first STA being assigned three spatial streams and a second STA being assigned three spatial streams for total six spatial streams assigned, and
   001000, corresponding to the first STA being assigned four spatial streams and the second STA being assigned three spatial streams for total seven spatial streams assigned.

7. The method of claim 3, wherein a value of one of the ten entries of the 6-bit spatial configuration subfield comprise:

001001, corresponding to a first STA being assigned four spatial streams and a second STA being assigned four spatial streams for total eight spatial streams assigned.

8. The method of claim 3, wherein, in an event that the number of STAs configured by the MU-MIMO allocation is three or more, first ten entries of the 6-bit spatial configuration subfield in another portion of the LUT are identical to the ten entries of the 6-bit spatial configuration subfield used for MU-MIMO allocation when the number of STAs configured by the MU-MIMO allocation is two.

9. The method of claim 2, wherein, in an event that a number of STAs configured by the MU-MIMO allocation is three, a respective portion of the LUT comprises twenty entries of the 6-bit spatial configuration subfield.

10. The method of claim 2, wherein, in an event that a number of STAs configured by the MU-MIMO allocation is four, a respective portion of the LUT comprises thirty-five entries of the 6-bit spatial configuration subfield.

11. The method of claim 2, wherein, in an event that a number of STAs configured by the MU-MIMO allocation is five, a respective portion of the LUT comprises forty-nine entries of the 6-bit spatial configuration subfield.

12. The method of claim 2, wherein, in an event that a number of STAs configured by the MU-MIMO allocation is six, a respective portion of the LUT comprises fifty-four entries of the 6-bit spatial configuration subfield.

13. The method of claim 2, wherein, in an event that a number of STAs configured by the MU-MIMO allocation is seven, a respective portion of the LUT comprises fifty entries of the 6-bit spatial configuration subfield.

14. The method of claim 2, wherein, in an event that a number of STAs configured by the MU-MIMO allocation is eight, a respective portion of the LUT comprises forty-one entries of the 6-bit spatial configuration subfield.

15. The method of claim 1, wherein the determining of the spatial stream configuration comprises:
receiving a downlink (DL) multi-user multiple-input-multiple-output (MU-MIMO) allocation signaling; and
determining the spatial stream configuration according to a value of the 6-bit spatial configuration subfield indicated in the signaling.

16. An apparatus, comprising:
a transceiver; and
a processor coupled to the transceiver and configured to perform operations comprising:
determining a spatial stream configuration according to a 6-bit spatial configuration subfield in a lookup table (LUT); and
performing, via the transceiver, a transmission using one or more spatial streams assigned based on the spatial stream configuration,
wherein the LUT supports up to sixteen spatial streams total for up to eight multi-user multiple-input-multiple-output (MU-MIMO) users.

17. The apparatus of claim 16, wherein the 6-bit spatial configuration subfield indicates a respective number of spatial streams assigned to each station (STA) of a plurality of STAs in a MU-MIMO allocation, and wherein:
in an event that a number of STAs configured by the MU-MIMO allocation is two, a respective portion of the LUT comprises ten entries of the 6-bit spatial configuration subfield, and
in an event that the number of STAs configured by the MU-MIMO allocation is three or more, first ten entries of the 6-bit spatial configuration subfield in another portion of the LUT are identical to the ten entries of the 6-bit spatial configuration subfield used for MU-MIMO allocation when the number of STAs configured by the MU-MIMO allocation is two.

18. The apparatus of claim 17, wherein:
values of four of the ten entries of the 6-bit spatial configuration subfield comprise:
000000, corresponding to a first STA being assigned one spatial stream and a second STA being assigned one spatial stream for total two spatial streams assigned,
000001, corresponding to the first STA being assigned two spatial streams and the second STA being assigned one spatial stream for total three spatial streams assigned,
000010, corresponding to the first STA being assigned three spatial streams and the second STA being assigned one spatial stream for total four spatial streams assigned, and
000011, corresponding to the first STA being assigned four spatial streams and the second STA being assigned one spatial stream for total five spatial streams assigned,
values of three of the ten entries of the 6-bit spatial configuration subfield comprise:
000100, corresponding to a first STA being assigned two spatial streams and a second STA being assigned two spatial streams for total four spatial streams assigned,
000101, corresponding to the first STA being assigned three spatial streams and the second STA being assigned two spatial streams for total five spatial streams assigned, and
000110, corresponding to the first STA being assigned four spatial streams and the second STA being assigned two spatial streams for total six spatial streams assigned,
values of two of the ten entries of the 6-bit spatial configuration subfield comprise:
000111, corresponding to a first STA being assigned three spatial streams and a second STA being assigned three spatial streams for total six spatial streams assigned, and
001000, corresponding to the first STA being assigned four spatial streams and the second STA being assigned three spatial streams for total seven spatial streams assigned, or
wherein a value of one of the ten entries of the 6-bit spatial configuration subfield comprise:
001001, corresponding to a first STA being assigned four spatial streams and a second STA being assigned four spatial streams for total eight spatial streams assigned.

19. The apparatus of claim 16, wherein, in determining the spatial stream configuration, the processor is configured to perform operations comprising:
receiving, via the transceiver, a downlink (DL) multi-user multiple-input-multiple-output (MU-MIMO) allocation signaling; and
determining the spatial stream configuration according to a value of the 6-bit spatial configuration subfield indicated in the signaling.

* * * * *